UNITED STATES PATENT OFFICE.

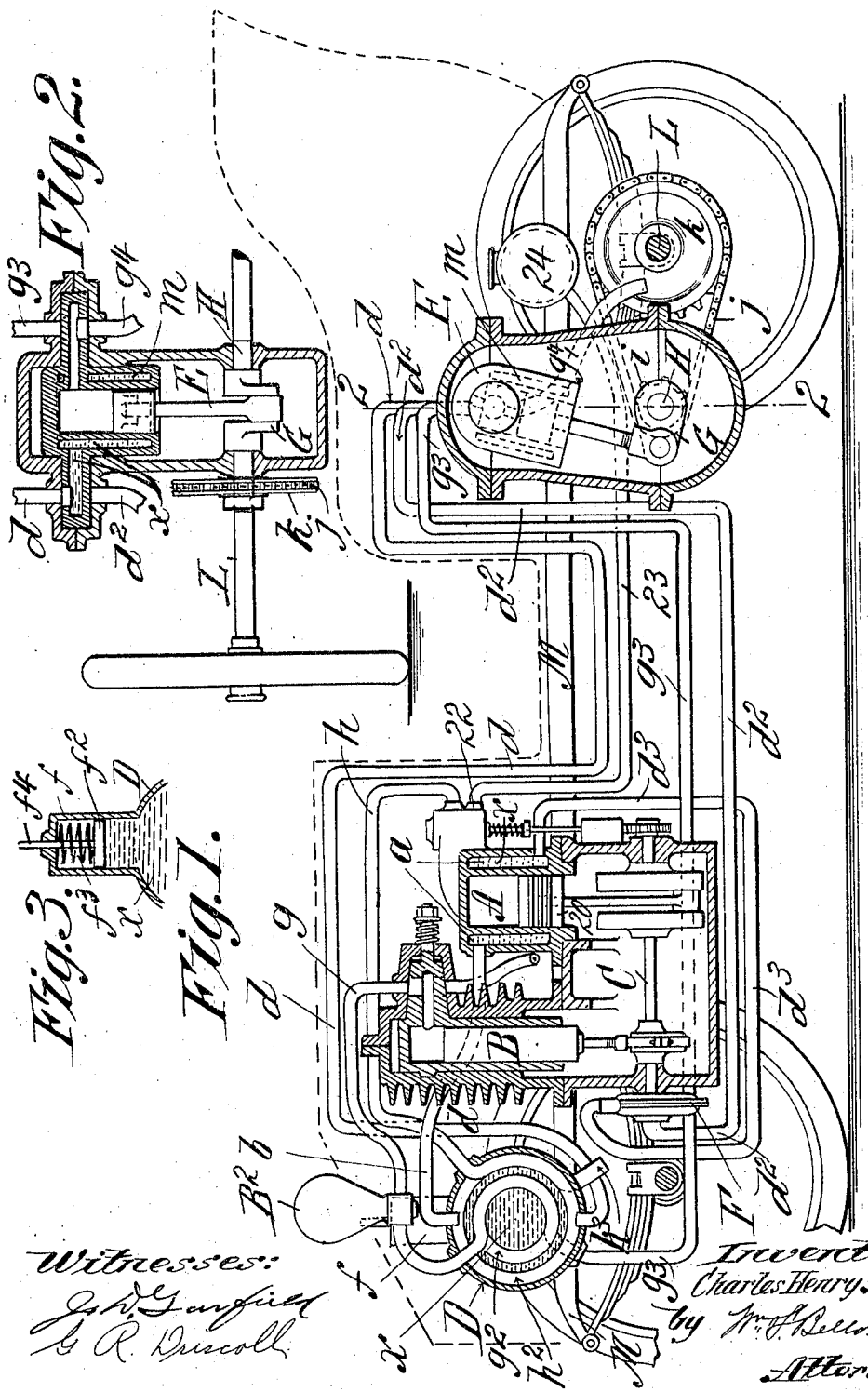

CHARLES HENRY ATKINS, OF SPRINGFIELD, MASSACHUSETTS.

MOTIVE-POWER APPARATUS.

951,171.  Specification of Letters Patent.  Patented Mar. 8, 1910.

Application filed November 4, 1904. Serial No. 231,387.

*To all whom it may concern:*

Be it known that I, CHARLES HENRY ATKINS, a citizen of the United States of America, and resident of Springfield, in the county of Hampden and State of Massachusetts, have invented certain new and useful Improvements in Motive-Power Apparatus, of which the following is a full, clear, and exact description.

This invention relates to an improved motive-power apparatus, having for its object to acquire a maximum of power from a given expenditure of liquid fuel.

The high efficiency in power is acquired by conserving all of the heat, both that of radiation and that of exhaust from the gas or other analogous engine embodied in the apparatus and utilizing the same, through suitable mediums, for augmenting the efficiency of the air cylinder, also comprised in the apparatus, and from which air cylinder the energy for the motive power purposes is taken.

A further advantage aimed at and attained by this invention is found in what is termed an unusual "flexibility", as a result of which an automobile, launch, or other vehicle to be propelled, may be driven at a maximum speed, or at any degree of speed below the maximum, as occasion may require.

In carrying out the invention, I provide in the motive power apparatus, in coöperative combination, a gas engine for driving an air compressor, said gas engine having its cylinders surrounded by a jacketed chamber for, preferably, oil, a closed tank or receptacle also containing oil, and pipe-connected with the oil chamber or the gas engine, and through which passes the conduit which carries the air from the compressor to the air engine, in such a manner as to establish a circulation of oil heated from the radiation of the gas engine cylinders through the closed tank for materially raising the temperature and effectiveness of the compressed air which is carried to the air engine. And I furthermore extend the circulation of the oil, heated as aforesaid, to and through a chamber surrounding the air cylinder of the air engine, for beneficial effect in the operation of the latter. And I furthermore increase the heat of the oil already heated from the radiation of the gas engine cylinder, and effective for heating the air to be carried to the air engine, and for heating also the air engine cylinder, by subjecting the oil in the closed tank to the heating action of the exhaust products from the cylinder of the gas engine. And I furthermore embody in the apparatus, particular forms, combinations and arrangements of parts all substantially as hereinafter fully described and set forth in the claims.

The improved apparatus is illustrated in the accompanying drawing in which,

Figure 1 is substantially a vertical longitudinal central sectional view. Fig. 2 is a sectional view as taken vertically through the air engine included in the apparatus on the line 2—2, Fig. 1. Fig. 3 is a sectional view vertically through a portion of the heating drum or receptacle and an expansion chamber provided thereto.

Similar characters of reference indicate corresponding parts in all of the views.

The apparatus is shown as arranged to be mounted on, and for driving an automobile.

A represents a gas engine of ordinary or approved construction, having a jacketed chamber $a$ surrounding its cylinder in which the piston 20 works; and 22 indicates the location of the inlet through which the explosive charges are introduced into the engine, as carried through the conduit 23, from the liquid fuel supply 24, and generally having a carbureter connected therewith.

The piston rod of the gas engine has connection with the crank shaft C, which is in driving connection with an air compressor B, which may be of any desired type.

$h$ represents a pipe for carrying the hot exhaust products of combustion away from the gas engine A, the same being continued in the coil $h^2$, which is inclosed within a drum or heating receptacle D, suitably located; and $h^3$ represents a continuation of the pipe $h$ and coil $h^2$ terminating and endwise open outside of the receptacle D.

E represents an air engine here shown as of the type comprising an oscillating cylinder, and having the jacketed chamber $m$ surrounding its cylinder, which cylinder also has hollow trunnions, one of which constitutes means for the ingress and egress of compressed and heated air into, and from the cylinder while the other hollow trunnion is in communication as represented at the left hand portion of Fig. 2, with the chamber $m$ surrounding the air engine cylinder.

A pipe $b$ leads from the jacketed chamber (which is an oil filled chamber) of the gas engine into the heating drum D, and a pipe $d$ leads from the interior of the heating receptacle into the jacketed chamber $m$ surrounding the cylinder of the air engine E; and pipe $d^2$ leads from the jacket $m$ of the air engine ultimately back to the jacketed chamber $a$ of the gas engine,—a centrifugal pump F being shown as connected in the last described conduit for the oil $x$ in circulation from the gas engine jacket $a$ to and through the heating receptacle D, thence to and through the jacket $m$ surrounding the air engine cylinder.

$g$ indicates the pipe for carrying the compressed air from the air compressor B to and through the pipe coil $g^2$ inclosed within the receptacle D, this coil being continued beyond the receptacle in the pipe sections $g^3$ to the inlet port of the air engine E, and $g^4$ represents the air exhaust or waste pipe of the air engine.

$B^2$ represents a receiver or reservoir, which may be considered as a part of the air compressor.

The aforementioned pump F for the oil is shown as on the shaft C, driven by the gas engine and driving the air compressor.

$f$ represents an expansion chamber opening into the drum or heating receptacle D, and having a piston $f^2$ therein, above which is the spring $f^3$ surrounding the guiding stem $f^4$.

A body of oil $x$ fills the jacketed chambers surrounding the gas engine cylinder and the air engine cylinder also filling the receptacle D and the conduits connecting these chambers and receptacle. The heat from the explosive gas in the gas engine A materially heats the oil surrounding the cylinder of such engine; and the oil in circulation from the gas engine chamber $a$ to and through the drum D is furthermore very considerably heated by the exhausting and very hot gases passing to and through the exhaust gas coil $h^2$ within the drum and in intimate heating relation to the oil contained in the drum. The compressed air passing from the compressor or the reservoir $B^2$ thereof to the air engine to serve as the motor agent therein and therefor, because of its passage through the air coils $g^2$ in the drum is subjected to the highly heating effects of the exhausting gas passing through the drum, and of the highly heated oil in the drum, and hence the efficiency of the compressed air for expansive reaction in the air engine is greatly increased.

The pump, while not a necessity, is a practical expedient readily combined in the apparatus for positively causing the oil circulation through the apparatus as described, and its location may be in any convenient place in such circulation.

The provision of the expansion chamber $f$ in connection with the receptacle D, is to the end of avoiding any straining or bursting effect on said receptacle by the heated and expanding oil, which is intended always to fill the drum.

While the liquid employed in circulation in the jackets of the gas and air engines and in the drum is herein referred to in the description above as "oil", other liquid or fluid might, without any departure from the invention as here contemplated, be employed in substitution for oil; and I do not intend to be understood as limiting the invention to the inclusion therein of gas and air engines or an air compressor, or pump, of any specific type, nor is the invention limited to any particular mode of transmission of the power developed by the air engine to the running gear of the automobile, or to other machinery which may be driven by this motive power apparatus. I have shown, however, that the oscillating air engine has driving connection with the crank G of a countershaft H, which is provided with a sprocket wheel $i$ driving a sprocket chain $j$, which runs around the sprocket wheel $k$ on the axle L of the automobile, the body of which is indicated as spring supported on the running gear frame M.

Having thus described my invention, what I claim and desire to secure by Letters Patent is:—

1. In a motive-power apparatus, a gas engine having a jacketed chamber, and an air engine having a jacketed chamber, an air compressor driven by the gas engine, a closed liquid receptacle, connections for liquid circulation between said receptacle, the gas engine chamber and the air-engine chamber, connections, for heating the liquid contents of said receptacle leading to the latter from the exhaust passage of the gas engine, and an air pipe having connection with the air compressor extending through said liquid receptacle, and continued to connection with the working cylinder of the air engine.

2. In an apparatus of the character described, in combination, a gas engine having an oil containing jacketed chamber surrounding its cylinder, an air compressor driven by the gas engine, a closed oil containing receptacle having a coiled air pipe therein and having another coiled pipe therein, at one end connected with the exhaust passage of the gas engine, and having its other end extended outwardly from said receptacle, an air engine having an oil containing jacketed chamber surrounding its cylinder, a conduit between the oil containing chamber of the gas engine and said receptacle another conduit leading from said receptacle to the oil containing jacketed chamber of the air engine, and a conduit leading from said last named chamber back to the oil containing chamber of the gas engine, a conduit connecting the air compressor with one end of the said air pipe coil and another conduit connecting the other end of the air pipe coil with the interior of the air engine cylinder.

3. In an apparatus of the character described, in combination, a gas engine having a jacketed chamber and an air engine, an air compressor driven by the gas engine, a closed receptacle and conduits having connections with said receptacles and with the jacketed chamber of the gas engine, and having a body of oil therein and filling and circulating by way of said conduits through the jacketed chamber of the gas engine, an expansion chamber for oil in connection with the closed receptacle, an air conduit leading from the air compressor through the oil in said tank and continued therebeyond and connecting into the cylinder of, and for operating, the air engine, and a conduit for carrying the exhaust products of the gas engine to said closed receptacle and for heating the oil therein and the air conducted therethrough.

4. In a motive power apparatus, in combination, a gas engine having a jacketed chamber, an air engine and an air compressor driven by the gas engine, a closed tank, a pipe leading from the air compressor into and continued in a coil within said closed tank, and further continued from the latter to the working cylinder of the air engine, a body of liquid in said closed tank and in the jacketed chamber of the gas engine, pipes leading from the closed tank to said gas engine chamber and from said chamber returning to the closed tank, and a pipe leading from the exhaust passage of the gas engine to, and continued in a coil within, the closed tank, and having an extension open to the atmosphere externally of said tank.

Signed by me at Springfield, Mass., in presence of two subscribing witnesses.

CHARLES HENRY ATKINS

Witnesses:
 WM. S. BELLOWS,
 G. R. DRISCOLL.